(12) United States Patent
Arai et al.

(10) Patent No.: US 12,662,028 B2
(45) Date of Patent: Jun. 23, 2026

(54) SEAT BACK PANEL, SEAT BACK FRAME AND VEHICLE SEAT

(71) Applicants: NHK SPRING CO., LTD., Yokohama (JP); SUBARU CORPORATION, Tokyo (JP)

(72) Inventors: Takumi Arai, Yokohama (JP); Takuma Oki, Yokohama (JP); Yusuke Yadomaru, Tokyo (JP); Masami Handa, Tokyo (JP); Toshimitu Nishio, Tokyo (JP)

(73) Assignees: NHK Spring Co., Ltd., Yokohama (JP); SUBARU CORPORATION, Tokyo (JP)

( * ) Notice: Subject to any disclaimer, the term of this patent is extended or adjusted under 35 U.S.C. 154(b) by 207 days.

(21) Appl. No.: 18/305,233

(22) Filed: Apr. 21, 2023

(65) Prior Publication Data

US 2024/0123880 A1     Apr. 18, 2024

(30) Foreign Application Priority Data

Apr. 26, 2022     (JP) ................................. 2022-072371

(51) Int. Cl.
| | |
|---|---|
| *B60N 2/42* | (2006.01) |
| *B60N 2/64* | (2006.01) |
| *A47C 7/46* | (2006.01) |
| *B60N 2/68* | (2006.01) |
| *B60N 2/70* | (2006.01) |

(52) U.S. Cl.
CPC ........... *B60N 2/4228* (2013.01); *B60N 2/643* (2013.01); *A47C 7/462* (2013.01); *B60N 2/686* (2013.01); *B60N 2/70* (2013.01)

(58) Field of Classification Search
CPC .... B60N 2/4228; B60N 2/686; B60N 2/7029; B60N 2/6009; B60N 2/70; A47C 7/462
See application file for complete search history.

(56) References Cited

U.S. PATENT DOCUMENTS

| | | | | |
|---|---|---|---|---|
| 7,850,246 | B2 * | 12/2010 | Kolich | ..................... B60N 2/70 297/DIG. 2 |
| 8,579,370 | B2 * | 11/2013 | Kanda | .................. B60N 2/4228 297/216.14 |
| 10,166,888 | B2 * | 1/2019 | Sugiyama | ............ B60N 2/2222 |
| 11,820,259 | B2 * | 11/2023 | Nagi | ...................... B60N 2/028 |
| 2017/0313223 | A1 | 11/2017 | Tomita et al. | |

FOREIGN PATENT DOCUMENTS

JP         2017-197038 A     11/2017

* cited by examiner

*Primary Examiner* — Syed A Islam
(74) *Attorney, Agent, or Firm* — Knobbe, Martens, Olson & Bear, LLP

(57)     ABSTRACT

A seat back panel includes a panel main body and a separate panel. The panel main body is disposed at a posterior portion of a seat back of a vehicle seat. The panel main body structures a portion of a main body portion of a seat back frame. An aperture is formed at a location of the panel main body that opposes a dorsal region of a seat occupant. The separate panel is attached to the main body portion and closes up the aperture. At a time of rear-end collision of the vehicle, the separate panel receives a load from the dorsal region of the seat occupant and relatively displaces toward the rear side of the seat back with respect to the panel main body.

3 Claims, 17 Drawing Sheets

42

86

42

86

SEAT BACK PANEL, SEAT BACK FRAME AND VEHICLE SEAT

CROSS-REFERENCE TO RELATED APPLICATION

This application is based on and claims priority under 35 USC 119 from Japanese Patent Application No. 2022-072371 filed on Apr. 26, 2022, the disclosure of which is incorporated by reference herein.

BACKGROUND

Technical Field

The present disclosure relates to a vehicle seat, and particularly relates to a seat back frame to be provided at a seat back and to a seat back panel that structures a portion of the seat back frame.

Related Art

Japanese Patent Application Laid-Open (JP-A) No. 2017-197038 discloses a seat back structure of a rear seat of a vehicle. In this seat back structure, a cushion member is provided at a sitting surface side of the seat back frame. The seat back frame is structured by a frame (a frame main body) and a seat back panel. The frame main body is structured of pipe members fabricated of metal, and forms a frame shape as seen in a seat front-and-rear direction. The seat back panel is formed of a plate member fabricated of metal, is disposed at the seat rear side of the frame main body, and is fixed to the frame main body by means such as adhesion or the like. In a state in which the seat back is tilted forward, the seat back panel functions as a placement surface on which luggage may be placed (in other words, a floor portion of a luggage compartment).

SUMMARY

In the conventional technology described above, the seat back panel is disposed at a posterior portion of the seat back. Therefore, at a time of rear-end collision of the vehicle, when a seat occupant acts to move by inertia toward the vehicle rear side, the seat back is resistant to intrusion by the dorsal region of the seat occupant. As a result, a timing at which the head region of the seat occupant is braced by a head rest provided at an upper portion of the seat back is delayed (a "contact time" is increased). Reducing this contact time contributes to the suppression of whiplash injuries of seat occupants.

In consideration of the circumstances described above, an object of the present disclosure is to provide a seat back panel, a seat back frame and a vehicle seat that may increase an intrusion amount into a seat back by the dorsal region of a seat occupant at a time of rear-end collision of a vehicle.

A seat back panel according to a first aspect of the present disclosure includes a panel main body and a separate panel. The panel main body is disposed at a posterior portion of a seat back of a vehicle seat and structures a portion of a main body portion of a seat back frame. An aperture is formed in the panel main body at a location opposing a dorsal region of a seat occupant. The separate panel is attached to the main body portion and closes up the aperture. At a time of a rear-end collision of the vehicle, the separate panel receives a load from the dorsal region and relatively displaces toward a rear side of the seat back with respect to the panel main body.

In the seat back panel according to the first aspect, the panel main body is disposed at the posterior portion of the seat back and structures a portion of the main body portion of the seat back frame. The aperture is formed in this panel main body at the location opposing the dorsal region of a seat occupant. This aperture is closed up by the separate panel that is attached to the main body portion of the seat back frame. At a time of a rear-end collision of the vehicle, the separate panel receives a load from the dorsal region of the seat occupant and is relatively displaced toward the rear side of the seat back with respect to the panel main body. Therefore, an intrusion amount into the seat back by the dorsal region of the seat occupant may be increased.

In a seat back panel according to a second aspect, in the first aspect, the separate panel includes an abutting portion that abuts against a rim portion of the aperture from the rear side of the seat back.

In the seat back panel according to the second aspect, the abutting portion provided at the separate panel abuts against the rim portion of the aperture of the panel main body from the rear side of the seat back. Therefore, when the seat back is disposed at, for example, a usual usage position, an unintended fall of the separate panel to the front side of the seat back relative to the panel main body may be prevented.

In a seat back panel according to a third aspect, in the first aspect or the second aspect, the separate panel is coupled to the main body portion via a resilient member.

In the seat back panel according to the third aspect, when a load from the dorsal region of a seat occupant acts on the separate panel at a time of rear-end collision of the vehicle, the resilient member coupling the separate panel to the main body portion of the seat back frame resiliently deforms. As a result, the separate panel relatively displaces to the seat back rear side with respect to the main body portion of the seat back frame. When the above-mentioned load no longer acts on the separate panel, the resilient member resiliently restores. As a result, the separate panel may return to its initial position.

In a seat back panel according to a fourth aspect, in the first aspect or the second aspect, one end portion of the separate panel is turnably coupled to the main body portion, and another end portion of the separate panel is coupled to the main body portion via a resilient member.

In the seat back panel according to the fourth aspect, when a load from the dorsal region of a seat occupant acts on the separate panel at a time of rear-end collision of the vehicle, the resilient member coupling the another end portion of the separate panel to the main body portion of the seat back frame resiliently deforms. As a result, the separate panel turns about the one end portion and relatively displaces to the seat back rear side with respect to the main body portion of the seat back frame. When the above-mentioned load no longer acts on the separate panel, the resilient member resiliently restores. As a result, the separate panel may return to its initial position.

In a seat back panel according to a fifth aspect, in the first aspect or the second aspect, the separate panel includes a hinge portion at which the separate panel inflects. One end portion of the separate panel in a direction orthogonal to the hinge portion is turnably coupled to the main body portion. Another end portion of the separate panel in the direction orthogonal to the hinge portion is coupled to the main body portion to be relatively displaceable toward a side thereof at which the one end portion is disposed.

In the seat back panel according to the fifth aspect, when a load from the dorsal region of a seat occupant acts on the separate panel at a time of rear-end collision of the vehicle, the separate panel inflects at the hinge portion provided in the separate panel. At this time, the one end portion of the separate panel in the directional orthogonal to the hinge portion turns relative to the main body portion of the seat back frame, and the another end portion in the direction orthogonal to the hinge portion relatively displaces, with respect to the main body portion of the seat back frame, to the side thereof at which the one end portion is disposed. Thus, the separate panel may relatively displace to the seat back rear side with respect to the main body portion of the seat back frame.

In a seat back panel according to a sixth aspect, in the first aspect or the second aspect, the separate panel is bisected into one side portion and another side portion. An end portion of the one side portion, at an opposite side thereof from a side at which the other side portion is disposed is turnably coupled to the main body portion. An end portion of the other side portion, at an opposite side thereof from a side at which the one side portion is disposed, is turnably coupled to the main body portion. The one side portion and the other side portion are coupled via a resilient member.

In the seat back panel according to the sixth aspect, when a load from the dorsal region of a seat occupant acts on the separate panel at a time of rear-end collision of the vehicle, the resilient member coupling the one side portion with the other side portion of the separate panel resiliently deforms. Thus, the one side portion turns relative to the main body portion of the seat back frame about the end portion of the one side portion at the opposite side thereof from the other side portion, and the other side portion turns relative to the main body portion of the seat back frame about the end portion of the other side portion at the opposite side thereof from the one side portion. Thus, the separate panel may relatively displace to the seat back rear side with respect to the main body portion of the seat back frame.

A seat back frame according to a seventh aspect of the present disclosure includes a frame main body provided at a seat back of a vehicle seat and the seat back panel according to any one of the first to sixth aspects. The frame main body is formed in a frame shape as seen in a front-and-rear direction of the seat back. The seat back panel is disposed at the rear side of the seat back relative to the frame main body. The panel main body is fixed to the frame main body and structures the main body portion.

In the seat back frame according to the seventh aspect, the frame main body is provided at the seat back of the vehicle seat and is formed in the frame shape in a front-and-rear direction view of the seat back. The seat back panel is disposed at the rear side of the seat back relative to the frame main body, the panel main body is fixed to the frame main body, and the seat back panel structures the main body portion of the seat back frame. Because this seat back panel is the seat back panel according to any one of the first to sixth aspects, operations and effects described above are provided.

A vehicle seat according to an eighth aspect of the present disclosure includes a seat cushion on which a seat occupant sits and a seat back that serves as a backrest for the seat occupant. A framework of the seat back is structured by the seat back frame according to the seventh aspect.

In the vehicle seat according to the eighth aspect, a seat occupant sits on the seat cushion and the seat back serves as a backrest for the seat occupant. Because the framework of the seat back is structured by the seat back frame according to the seventh aspect, operations and effects described above are provided.

As described above, the seat back panel, seat back frame and vehicle seat according to the present disclosure may increase an intrusion amount into the seat back by the dorsal region of a seat occupant at a time of rear-end collision of the vehicle.

BRIEF DESCRIPTION OF THE DRAWINGS

Exemplary embodiments of the present disclosure will be described in detail based on the following figures, wherein.

DETAILED DESCRIPTION

First Exemplary Embodiment

Figure 1:
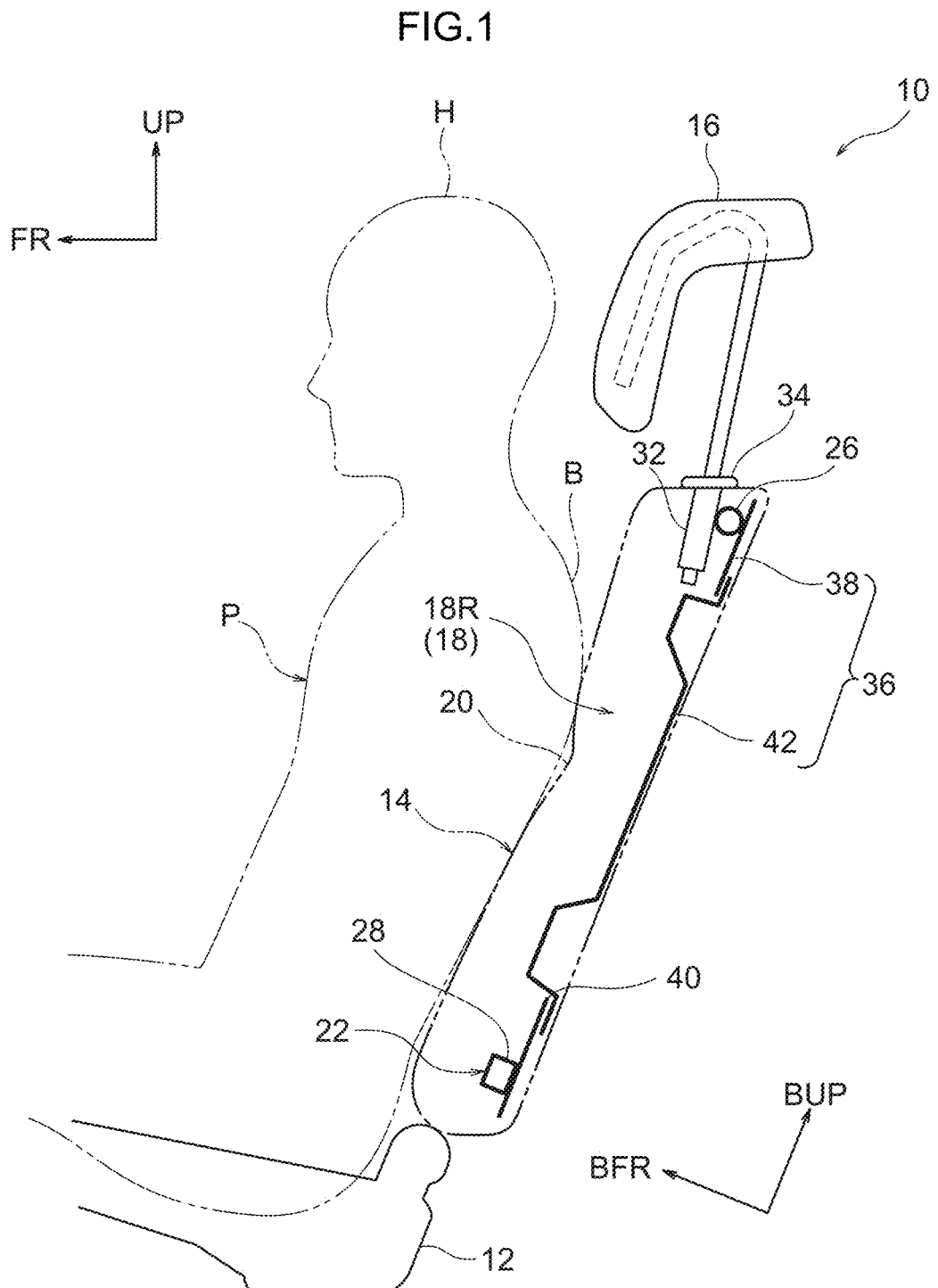
FIG. 1 is a side view showing a vehicle seat according to a first exemplary embodiment.

Below, a vehicle seat 10 relating to a first exemplary embodiment of the present disclosure is described with reference to FIG. 1 to FIG. 14. The arrows FR and UP that are marked where appropriate in the drawings indicate, respectively, a front direction and an upper direction of a vehicle in which the vehicle seat 10 is installed. With a view to aiding understanding of the drawings, some reference symbols may be omitted from the drawings.

As shown in FIG. 1, the vehicle seat 10 according to the present exemplary embodiment is provided with a seat cushion 12, on which a seat occupant P who is an occupant of the vehicle sits, and a seat back 14 that serves as a backrest for the seat occupant P. The vehicle seat 10 is a seat in a second row or a third row of the vehicle and is, as an example, a three-person seat. The seat back 14 of the vehicle seat 10 is, for example, a structure that can be divided 60:40 and tilted. A luggage compartment LR is provided at the vehicle rear side of the seat back 14. The arrows BFR, BLH and BUP that are marked where appropriate in the drawings indicate, respectively, a front direction, a left direction and an upper direction of the seat back 14. Where descriptions are given below simply using the directions front, rear, left, right, upper and lower, these indicate directions with respect to the seat back 14.

Figure 2:
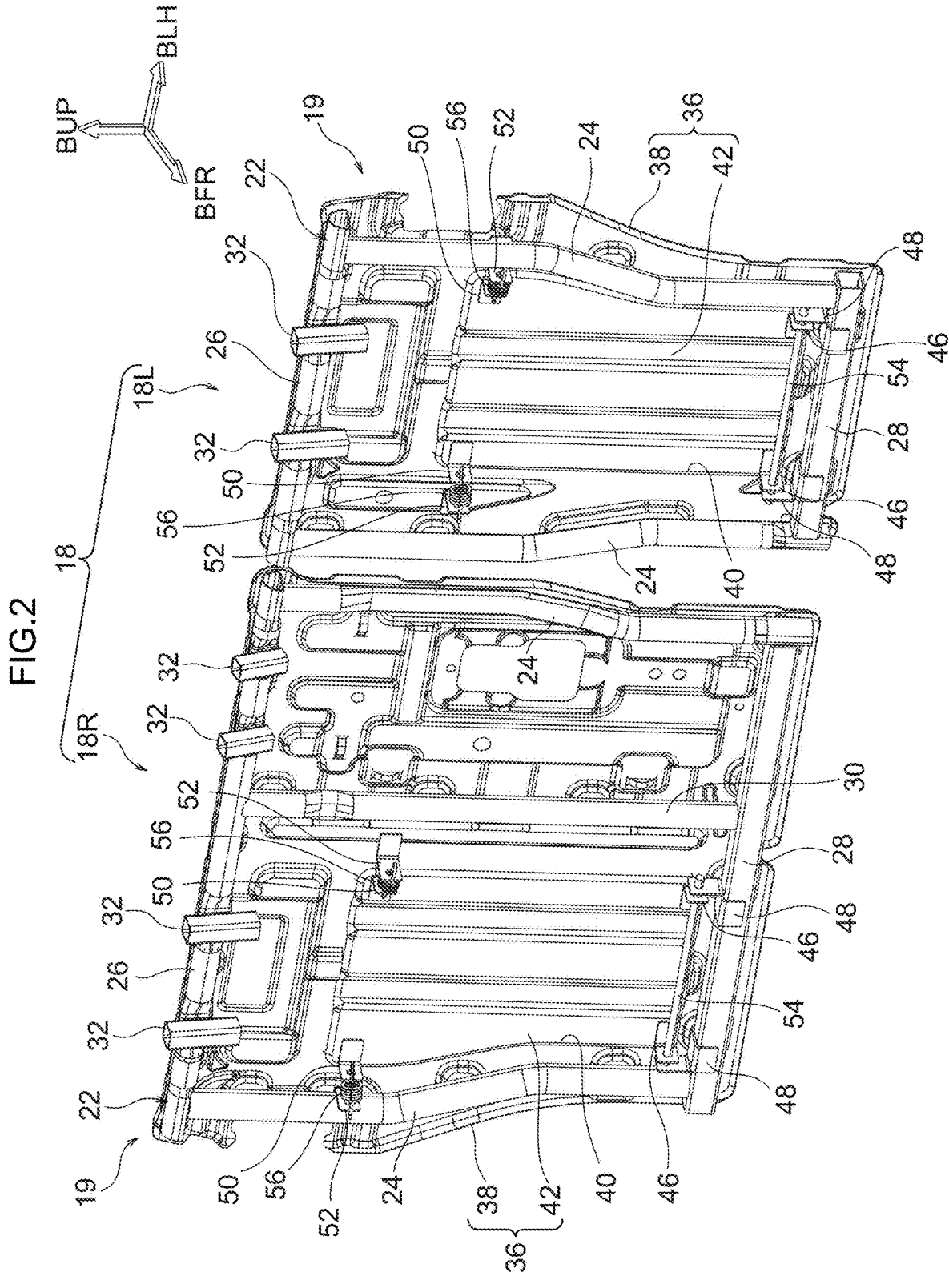
FIG. 2 is a perspective view showing a seat back frame according to the first exemplary embodiment.
Figure 3:
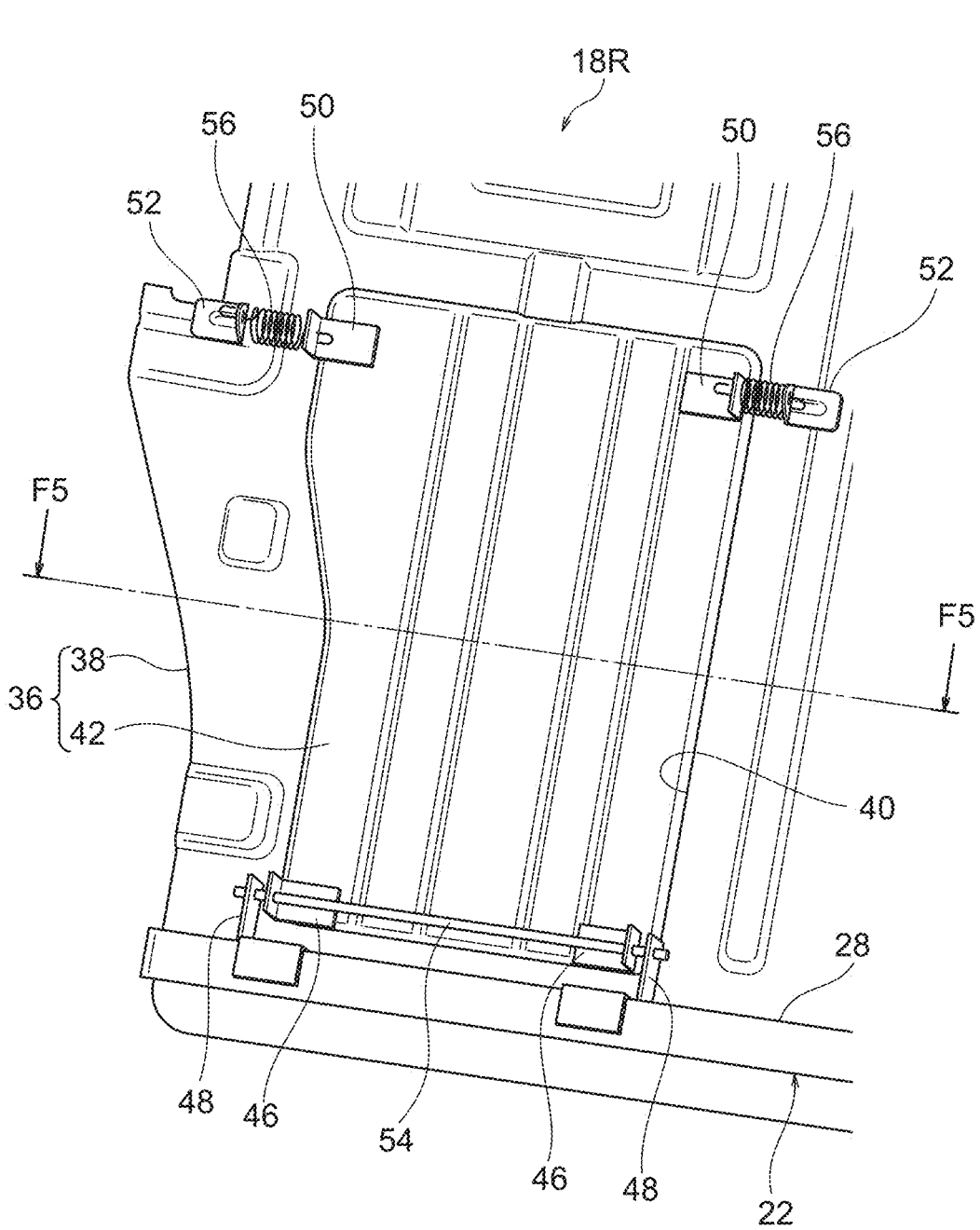
FIG. 3 is a perspective view showing a magnified portion of the structure shown in FIG. 2.
Figure 4:
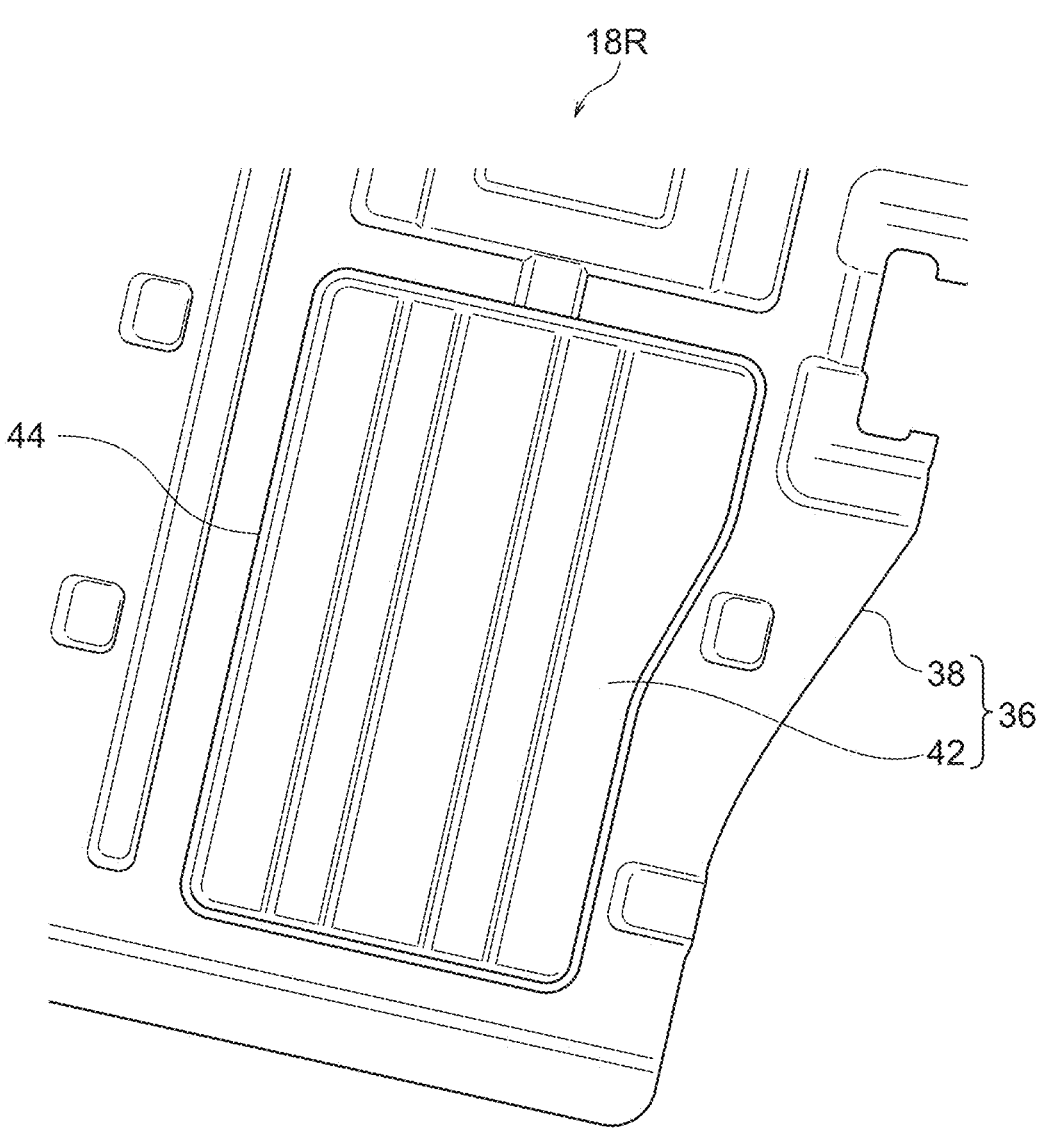
FIG. 4 is a perspective view showing a state in which the structure shown in FIG. 3 is seen from a rear side of the seat back.
Figure 5:
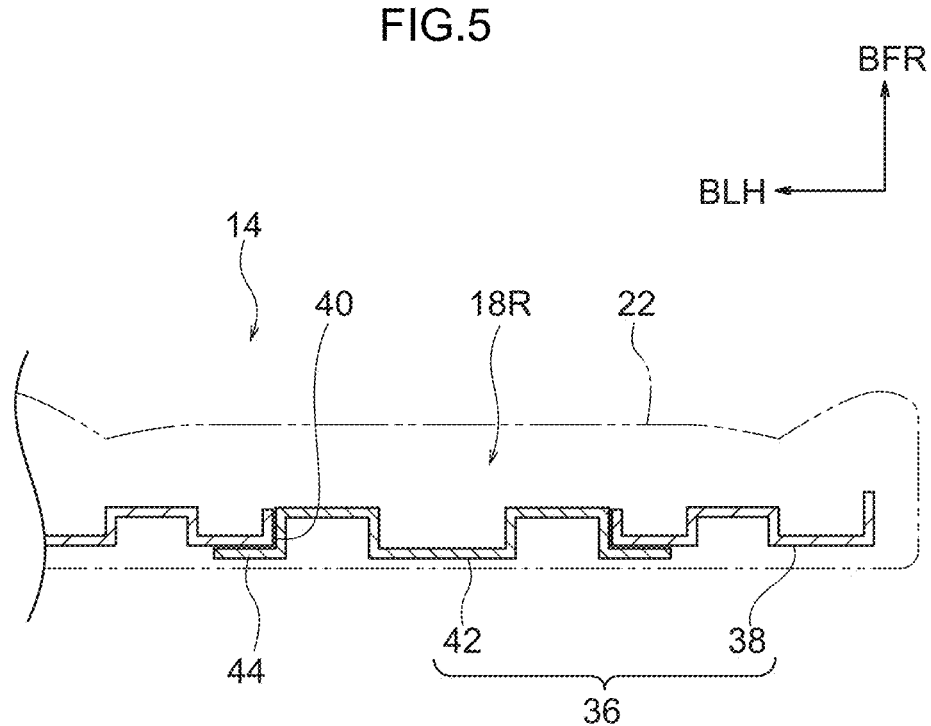
FIG. 5 is a sectional view showing a section cut along line F5-F5 in FIG. 3.

As shown in FIG. 2, a seat back frame 18 that structures a framework of the seat back 14 is divided into a left side frame 18L and a right side frame 18R. As an example in the present exemplary embodiment, the right side frame 18R is specified with a larger dimension in the left-and-right direction than the left side frame 18L. Seat back pads, which are cushion members that are not shown in the drawings, are respectively attached to the left side frame 18L and the right side frame 18R at the front sides thereof. The left side frame 18L, the right side frame 18R and the seat back pads are respectively covered by seat back covers 20 (see FIG. 1).

The left side frame 18L and right side frame 18R are each turnably coupled to a floor portion of the vehicle body via hinges that are not shown in the drawings. Respective locking mechanisms, which are not shown in the drawings, are attached to a left end portion of an upper portion of the left side frame 18L and a right end portion of an upper portion of the right side frame 18R. By engaging with latches provided at the vehicle body, these locking mechanisms retain the left side frame 18L and right side frame 18R at usual usage positions (see FIG. 1). When locking by the locking mechanisms is released, the left side frame 18L and right side frame 18R may be tilted forward to forward-tilted positions in which the left side frame 18L and right side frame 18R are overlaid over the seat cushion 12. In the state in which the left side frame 18L and right side frame 18R are disposed at the usual usage positions, front, rear, left, right, upper and lower directions of the seat back 14 substantially coincide with front, rear, left, right, upper and lower directions of the vehicle.

The left side frame 18L and right side frame 18R are each provided with a frame main body 22, which is formed in a frame shape as seen in the front-and-rear direction, and a seat back panel 36, which is disposed at the rear side relative to the frame main body 22 and is fixed to the frame main body 22. The frame main body 22 of the left side frame 18L includes a left and right pair of side frames 24, an upper frame 26, and a lower frame 28. The side frames 24 are spaced apart from one another in the left-and-right direction and extend in the vertical direction. The upper frame 26 links upper end portions of the left and right side frames 24 in the left-and-right direction. The lower frame 28 links lower end portions of the left and right side frames 24 in the left-and-right direction. A left and right pair of head rest support brackets 32 are fixed to left-and-right direction intermediate portions of the upper frame 26 of the left side frame 18L.

The frame main body 22 of the right side frame 18R includes another left and right pair of the side frames 24 that are spaced apart from one another in the left-and-right direction and extend in the vertical direction, another of the upper frame 26 that links upper end portions of the left and right side frames 24, another of the lower frame 28 that links lower end portions of the left and right side frames 24 in the left-and-right direction, and a center frame 30 that links a left-and-right direction middle portion of the upper frame 26 with a left-and-right direction middle portion of the lower frame 28 in the vertical direction. Respective left and right pairs of the head rest support brackets 32 are fixed to a right side region and a left side region of the upper frame 26 of the right side frame 18R. The side frames 24, upper frames 26, lower frames 28, center frame 30 and head rest support brackets 32 are structured by, for example, pipe members fabricated of metal.

As shown in FIG. 1, a head rest 16 is coupled, via a head rest support 34, to the left and right head rest support brackets 32 that are fixed to the right side region of the upper frame 26 of the right side frame 18R. The head rest 16 braces the head region H of a seat occupant P sitting at the right side of the three-person vehicle seat 10. Another of the head rest 16 is coupled, via another of the head rest support 34, to the left and right head rest support brackets 32 that are fixed to the left side region of the upper frame 26 of the right side frame 18R. This head rest 16 braces the head region of a seat occupant (not shown in the drawings) sitting at the middle of the three-person vehicle seat 10. Yet another of the head rest 16 is coupled, via yet another of the head rest support 34, to the left and right head rest support brackets 32 that are fixed to the upper frame 26 of the left side frame 18L. This head rest 16 braces the head region of a seat occupant (not shown in the drawings) sitting at the left end of the three-person vehicle seat 10.

The seat back panels 36 of the left side frame 18L and right side frame 18R each include a panel main body 38 and a separate panel 42. Each panel main body 38, together with the frame main body 22, structures a main body portion 19 of the left side frame 18L or the right side frame 18R (main body portions 19 of the seat back frame 18). The panel main body 38 and the separate panel 42 are structured by, for example, plate members fabricated of metal, resin or corrugated plastic. The panel main bodies 38 and separate panels 42 are disposed with plate thickness directions thereof in the front-and-rear direction. An aperture 40 is formed in the panel main body 38 of the right side frame 18R at a location opposing the dorsal region B of the seat occupant P sitting at the right side of the three-person vehicle seat 10. Another of the aperture 40 is formed in the panel main body 38 of the left side frame 18L at a location opposing the dorsal region B of the seat occupant sitting at the left side of the three-person vehicle seat 10. Each aperture 40 is closed up by the corresponding separate panel 42.

Structures of the seat back panel 36 of the left side frame 18L and the seat back panel 36 of the right side frame 18R in the vicinities of the separate panels 42 are basically similar structures. Accordingly, the seat back panel 36 at the right side is mainly described below, with reference to FIG. 3 to FIG. 8.

As shown in FIG. 3 to FIG. 6, as seen in the front-and-rear direction, the aperture 40 formed in the panel main body 38 is formed in a long, narrow rectangular shape whose longer direction is in the vertical direction. The aperture 40 is disposed directly below the head rest 16 that braces the head region H of the seat occupant P, and is disposed directly behind the dorsal region B of the seat occupant P. The seat occupant P has a build similar to, for example, an AM50 dummy (representing the 50th percentile of adult males in America). A dimension of the aperture 40 in the left-and-right direction is specified to be similar to, for example, a dimension between upper corners of left and right shoulder blades of the seat occupant P. A dimension of the aperture 40 in the vertical direction is specified to be, for example, similar to a dimension from the first thoracic vertebra to the twelfth thoracic vertebra of the seat occupant P. Thus, the aperture 40 opposes the dorsal region B of the seat occupant P from the vehicle rear side thereof in a range of height from the first thoracic vertebra to the twelfth thoracic vertebra of the seat occupant P, with a width similar to the dimension between the upper corners of the left and right shoulder blades of the seat occupant P.

Seen in the front-and-rear direction, the separate panel 42 is formed in a long, narrow rectangular shape similar to the aperture 40. The separate panel 42 fits to the inner side of the aperture 40. The separate panel 42 is disposed in a region of the seat back panel 36 on which a load from the dorsal area of the seat occupant P first acts at a time of rear-end collision of the vehicle. A flange portion 44 is formed at outer periphery portions of the separate panel 42. The flange portion 44 abuts against rim portions of the aperture 40 from the rear side thereof. The flange portion 44 limits relative displacement of the separate panel 42 to the front side with respect to the panel main body 38. The flange portion 44 is equivalent to an "abutting portion" of the present disclosure.

Respective brackets 46 are fixed to both of left and right end portions of a lower end portion (one end portion) of the separate panel 42. Left and right brackets 48 corresponding with the left and right brackets 46 are fixed to the lower frame 28. Upper end portions of the left and right brackets 48 oppose the left and right brackets 46 from outer sides thereof in the left-and-right direction. A shaft 54 penetrates through the brackets 46 and 48. An axial direction of the shaft 54 is in the left-and-right direction. Thus, the lower end portion of the separate panel 42 is coupled to the panel main body 38 to be turnable about the shaft 54. Rivets or the like may be employed instead of the shaft 54. These brackets 48 may be structures that are fixed to the panel main body 38.

Respective brackets 50 are fixed to both of left and right end portions of an upper end portion (another end portion) of the separate panel 42. Left and right brackets 52 corresponding with the left and right brackets 50 are fixed to the panel main body 38. The brackets 52 oppose the brackets 50 from the outer sides thereof in the left-and-right direction. Tension coil springs 56, which are resilient members, span between each bracket 52 and the corresponding bracket 50. Thus, the upper end portion of the separate panel 42 is coupled to the panel main body 38 via the left and right tension coil springs 56. These resilient members are not limited to the tension coil springs 56 but may be alternative kinds of springs, rubbers or the like.

In the vehicle seat 10 with the structure described above, at usual times the separate panel 42 is retained at the usual position shown in FIG. 1 to FIG. 5 and FIG. 7 by the left and right tension coil springs 56. In this state, because the separate panel 42 fits to the aperture 40 of the panel main body 38, the aperture 40 is closed up.

Figure 6:
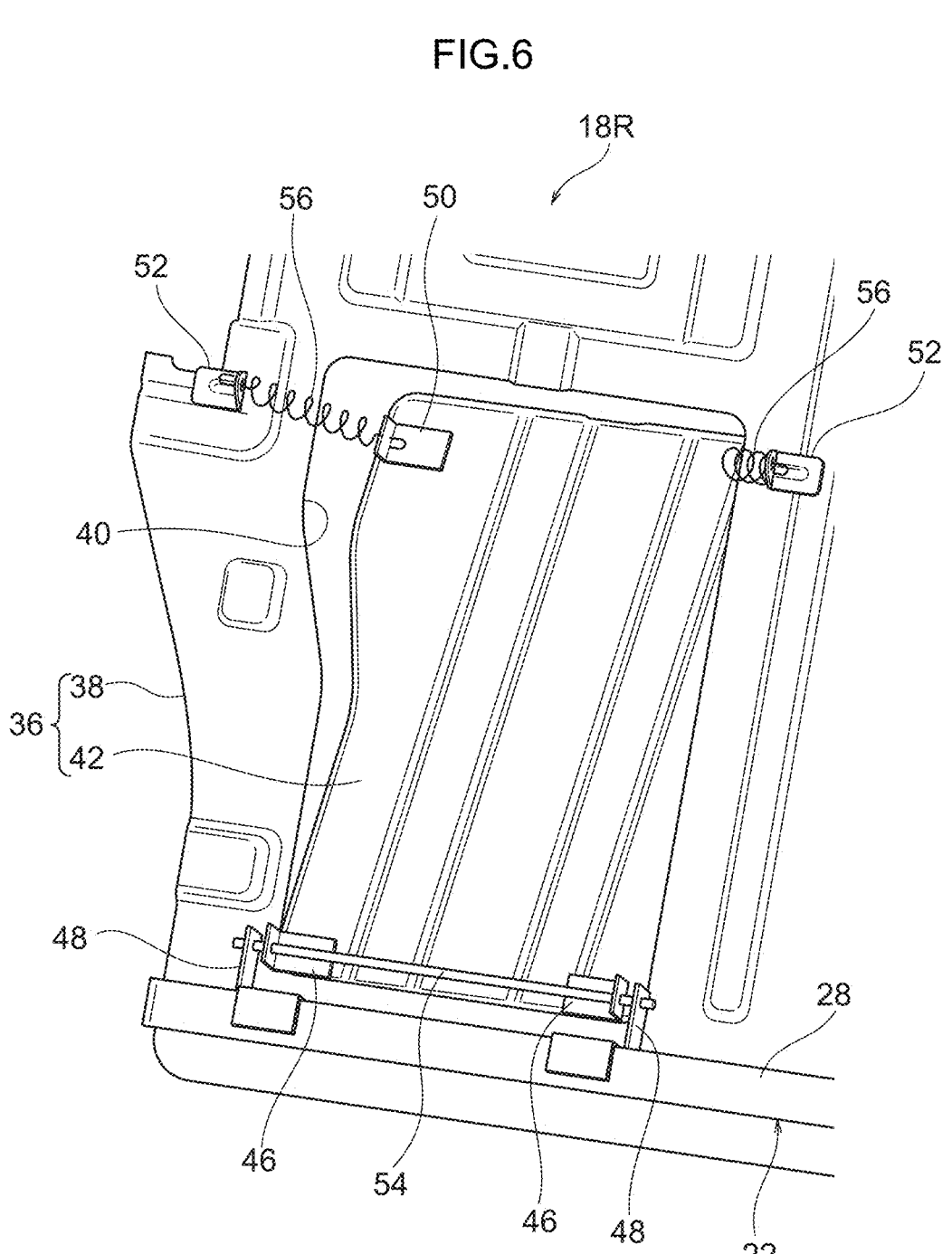
FIG. 6 is a perspective view corresponding to FIG. 3, showing a state in which a separate panel is relatively displaced toward the rear side of the seat back with respect to a panel main body.
Figure 7:
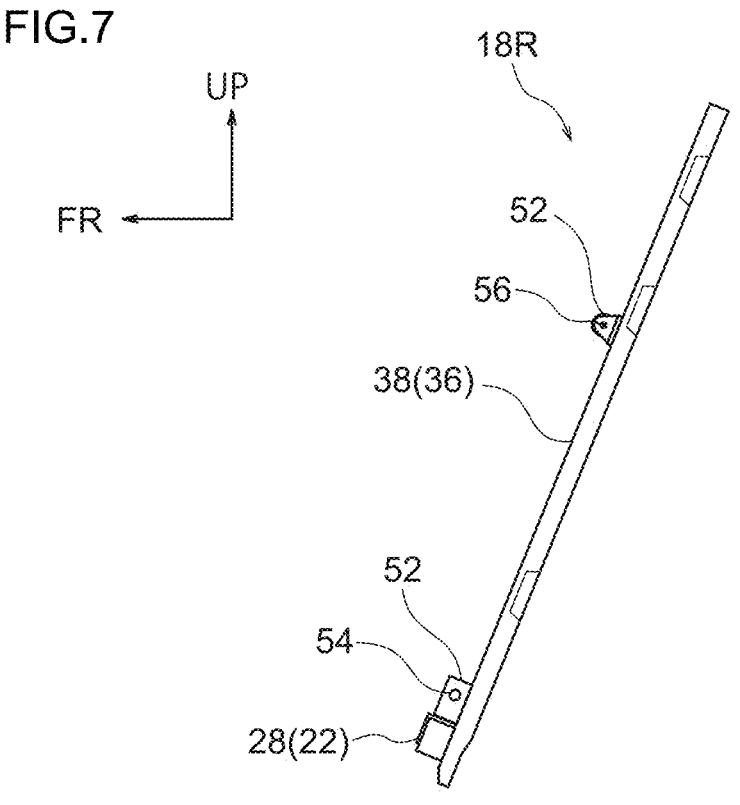
FIG. 7 is a side view showing the seat back frame according to the first exemplary embodiment.
Figure 8:
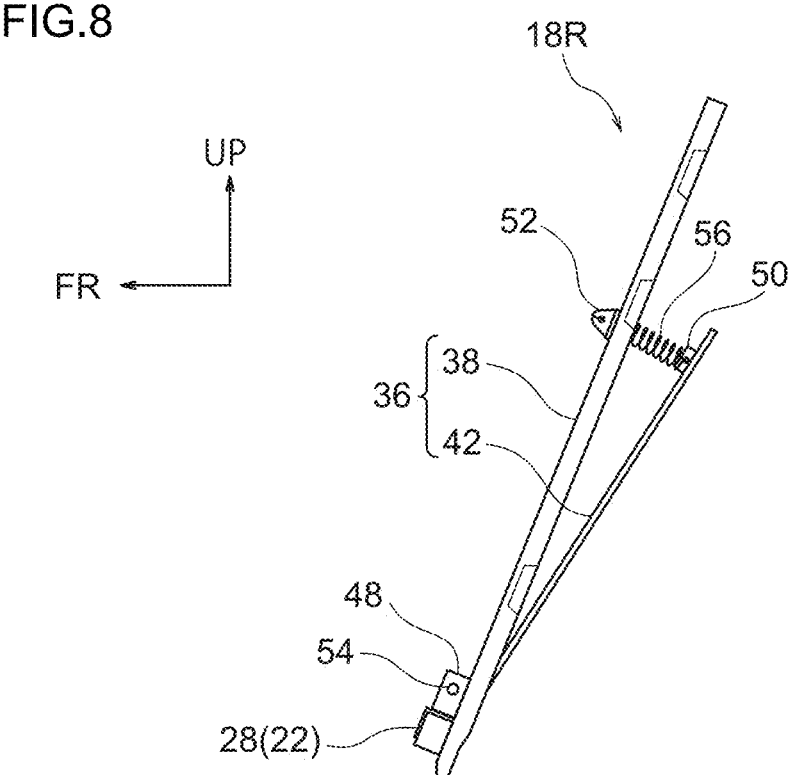
FIG. 8 is a side view corresponding to FIG. 7, showing the state in which the separate panel is relatively displaced to the rear side of the seat back with respect to the panel main body.

At a time of rear-end collision of the vehicle, the seat occupant P acts to move by inertia toward the vehicle rear side, and a load from the dorsal region B of the seat occupant P is applied to the separate panel 42. As a result, as shown in FIG. 6 and FIG. 8, the separate panel 42 relatively displaces toward the rear side with respect to the panel main body 38. More specifically, when the load from the dorsal region B of the seat occupant P acts on the separate panel 42 at the time of rear-end collision of the vehicle, the left and right tension coil springs 56 coupling the upper end portion of the separate panel 42 to the panel main body 38 are resiliently deformed in the tension directions thereof. Hence, the separate panel 42 turns about the shaft 54 provided at the lower end portion of the separate panel 42, and the separate panel 42 relatively displaces to the rear side with respect to the panel main body 38. When the above-mentioned load no longer acts on the separate panel 42, the left and right tension coil springs 56 resiliently restore. As a result, the separate panel 42 is restored to the initial usual position. The above-mentioned rear-end collision is, for example, a collision similar to a rear-end collision according to a rear-impact neck protection test defined by the China New Car Assessment Program (C-NCAP).

—Operation and Effects—

Now, operation and effects of the present exemplary embodiment are described.

In the present exemplary embodiment, each seat back panel 36 structuring a portion of the main body portion 19 of the seat back frame 18 is disposed at a posterior portion of the seat back 14 of the vehicle seat 10. The aperture 40 is formed in the panel main body 38 of the seat back panel 36 at the location opposing the dorsal region B of a seat occupant P. The aperture 40 is closed up by the separate panel 42 that is attached to the main body portion 19. At a time of rear-end collision of the vehicle, the separate panel 42 receives a load from the dorsal region B of the seat occupant P and is relatively displaced to the rear side with respect to the panel main body 38. Therefore, an intrusion amount into the seat back 14 by the dorsal region B of the seat occupant P may be increased. As a result, a timing at which the head region H of the seat occupant P is braced by the head rest 16 is earlier (the "contact time" is reduced), which contributes to suppression of a whiplash injury of the seat occupant P.

Figure 9:
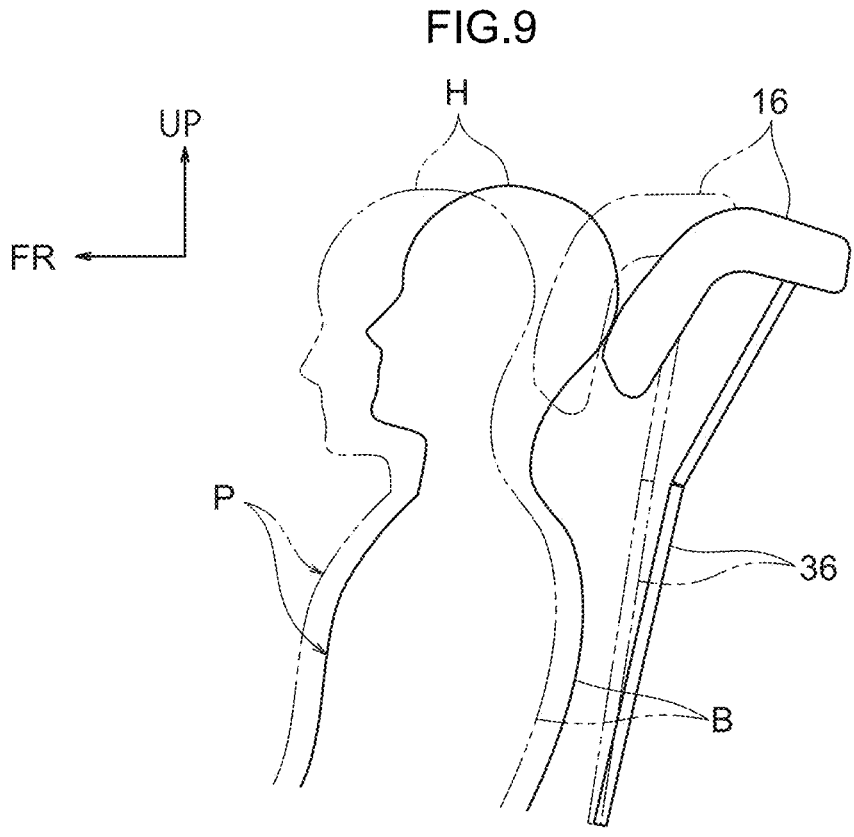
FIG. 9 is a schematic side view showing a state of a vehicle seat according to a comparative example at a time of rear-end collision.
Figure 10:
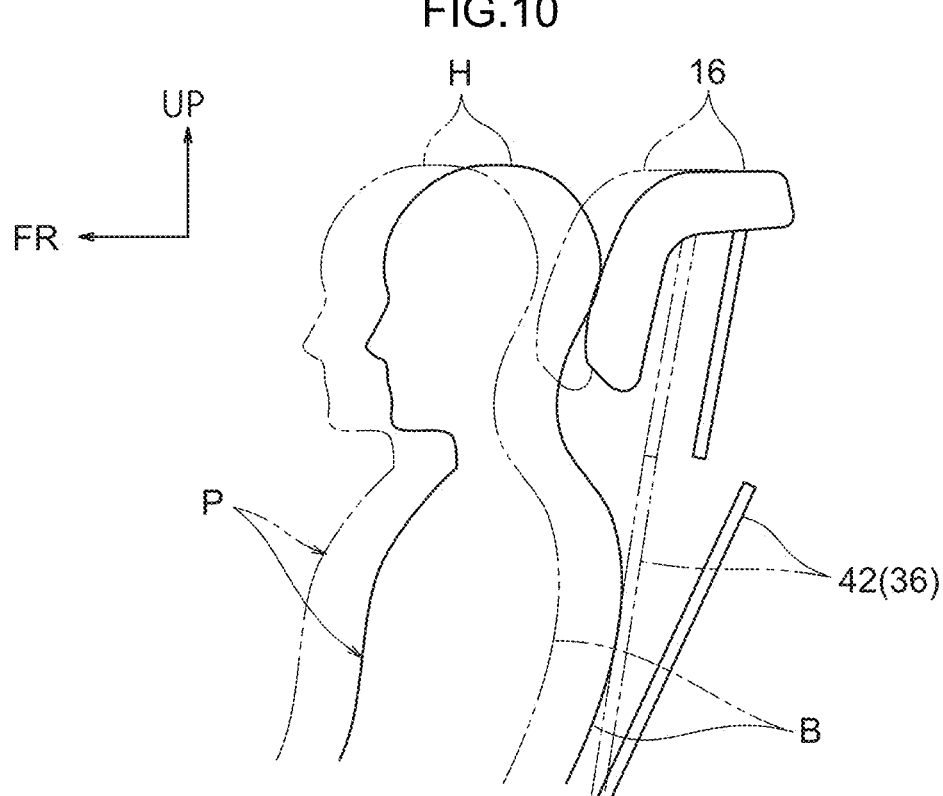
FIG. 10 is a schematic side view showing a state of the vehicle seat according to the first exemplary embodiment at a time of rear-end collision.
Figures 11, 12:
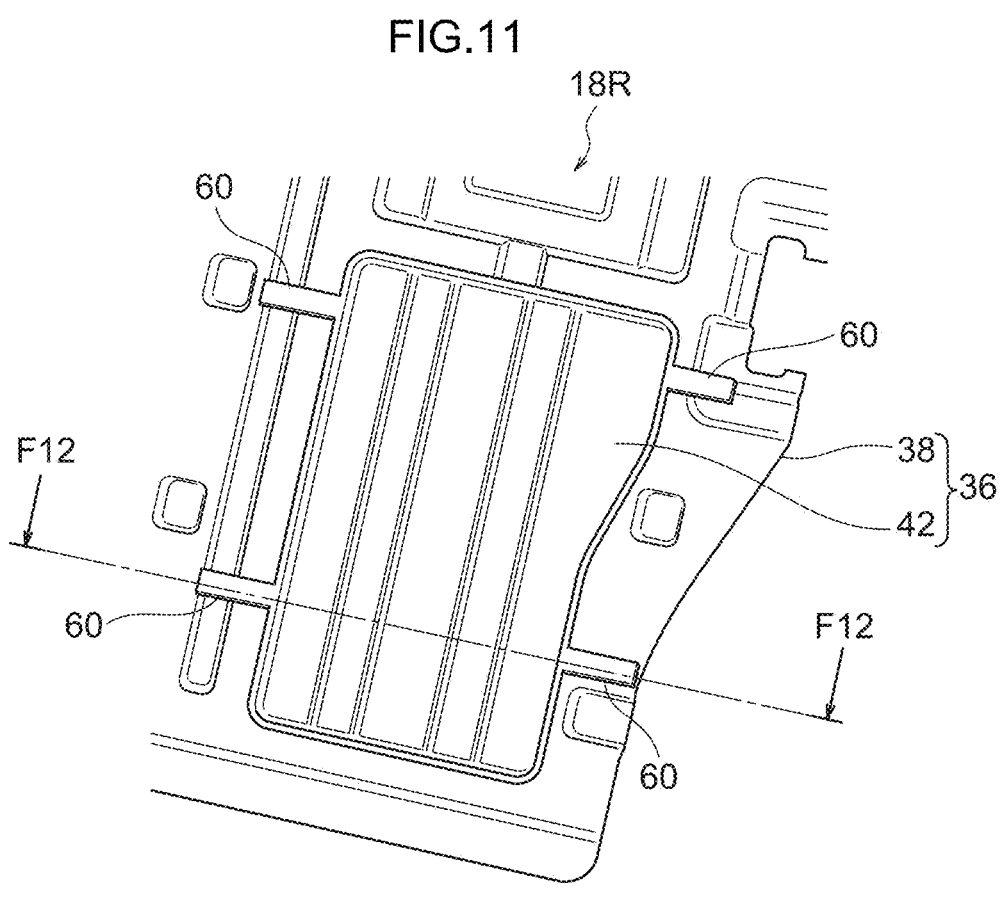
FIG. 11 is a perspective view corresponding to FIG. 4, showing a first variant example of the seat back panel according to the first exemplary embodiment.
FIG. 12 is a sectional view showing a section cut along line F12-F12 in FIG. 11.

A supplementary description of the effect described above is given with reference to a comparative example illustrated in FIG. 9. In this comparative example, the seat back panel 36 is not divided into the panel main body 38 and the separate panel 42. Therefore, at a time of rear-end collision of a vehicle, the seat back is more resistant to intrusion by the dorsal region B of a seat occupant P, and a timing at which the head region H of the seat occupant P is braced by the head rest 16 is delayed. By contrast, in the present exemplary embodiment as illustrated in FIG. 10, the separate panel 42 is pushed by the dorsal region B of the seat occupant P and displaces to the rear side. Thus, intrusion of the dorsal region B of the seat occupant P into the seat back 14 is facilitated, and the head region H of the seat occupant P is promptly braced by the head rest 16.

In the present exemplary embodiment, the flange portion 44 provided at the outer periphery portions of the separate panel 42 abuts against the rim portions of the aperture 40 of the panel main body 38 from the rear side thereof. Therefore, when the seat back 14 is disposed at the usual usage position, an unintended fall of the separate panel 42 to the front side of the seat back 14 relative to the panel main body 38 may be prevented. If the vehicle has a front-end collision in the state in which the seat back 14 is disposed at the usual usage position, luggage placed in the luggage compartment LR may collide with the seat back 14 from the rear side. Even in this situation, however, an unintended fall of the separate panel 42 to the front side of the seat back 14 relative to the panel main body 38 may be prevented.

In the present exemplary embodiment, when a load from the dorsal region B of the seat occupant P acts on the separate panel 42 at a time of rear-end collision of the vehicle, the left and right tension coil springs 56 coupling the upper end portion of the separate panel 42 to the main body portion 19 resiliently deform. As a result, the separate panel 42 turns about the shaft 54 provided at the lower end portion of the separate panel 42 and relatively displaces to the rear side with respect to the main body portion 19. When the above-mentioned load no longer acts on the separate panel 42, the left and right tension coil springs 56 resiliently restore. As a result, the separate panel 42 may return to the initial usual position. Therefore, a repair of the seat back 14 is not required.

In the first exemplary embodiment described above, the lower end portion of the separate panel 42 is turnably coupled to the main body portion 19 and the upper end portion of the separate panel 42 is coupled to the main body portion 19 via the tension coil springs 56 (resilient members), but this is not limiting. Structures are possible in which the upper end portion, left end portion or right end portion of the separate panel 42 is turnably coupled to the main body portion 19 and the lower end portion, right end portion or left end portion of the separate panel 42 is coupled to the main body portion 19 via resilient members.

In the exemplary embodiment described above, if a tether anchor (tether wire) that anchors a top tether of a child seat is provided at the seat back frame 18, it is preferable if the tether anchor is provided at the lower side relative to the separate panel 42.

Figures 13, 14:
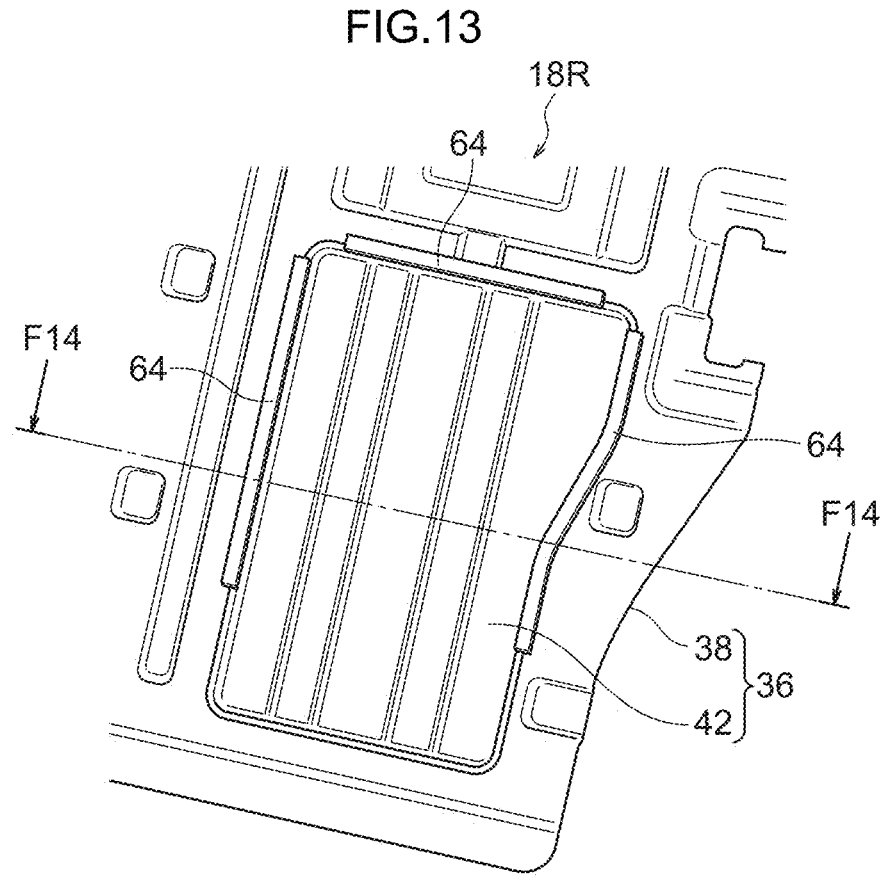
FIG. 13 is a perspective view corresponding to FIG. 4, showing a second variant example of the seat back panel according to the first exemplary embodiment.
FIG. 14 is a sectional view showing a section cut along line F14-F14 in FIG. 13.

The exemplary embodiment described above has a structure in which the flange portion 44 (abutting portion) provided at the outer periphery portions of the separate panel 42 abuts against the rim portions of the aperture 40 of the panel main body 38 from the rear side thereof, but this is not limiting. Structures such as, for example, a first variant example shown in FIG. 11 and FIG. 12 and a second variant example shown in FIG. 13 and FIG. 14 are also applicable.

In the first variant example, pairs of upper and lower catch pawls 60 are provided at both the left and right end portions of the separate panel 42. The catch pawls 60 are equivalent to the abutting portion of the present disclosure. The catch pawls 60 extend to the outer sides in the left-and-right direction from the separate panel 42 at the rear face side (posterior face side) of the panel main body 38. Distal end portions of the catch pawls 60 are inflected toward the front side and are inserted into penetrating holes 62 formed in the panel main body 38. Consequently, the separate panel 42 may be securely retained at the panel main body 38 in opposition to a load acting on the separate panel 42 from the rear side.

In the second variant example, catch flange portions 64 with "L" shapes in cross section are provided at the upper end portion and both the left and right end portions of the separate panel 42. The catch flanges 64 are equivalent to the abutting portion of the present disclosure. Inflected portions 66 that are inflected toward the rear side are provided at the rim portions of the aperture 40 of the panel main body 38 in correspondence with the catch flange portions 64. The catch flange portions 64 are caught on the inflected portions 66. Consequently, the separate panel 42 may be securely retained at the panel main body 38 in opposition to a load acting on the separate panel 42 from the rear side.

Now, alternative exemplary embodiments of the present disclosure are described. Structures and operations that are basically the same as in the first exemplary embodiment are assigned the same reference numerals as in the first exemplary embodiment and are not described.

Second Exemplary Embodiment

Figure 15:
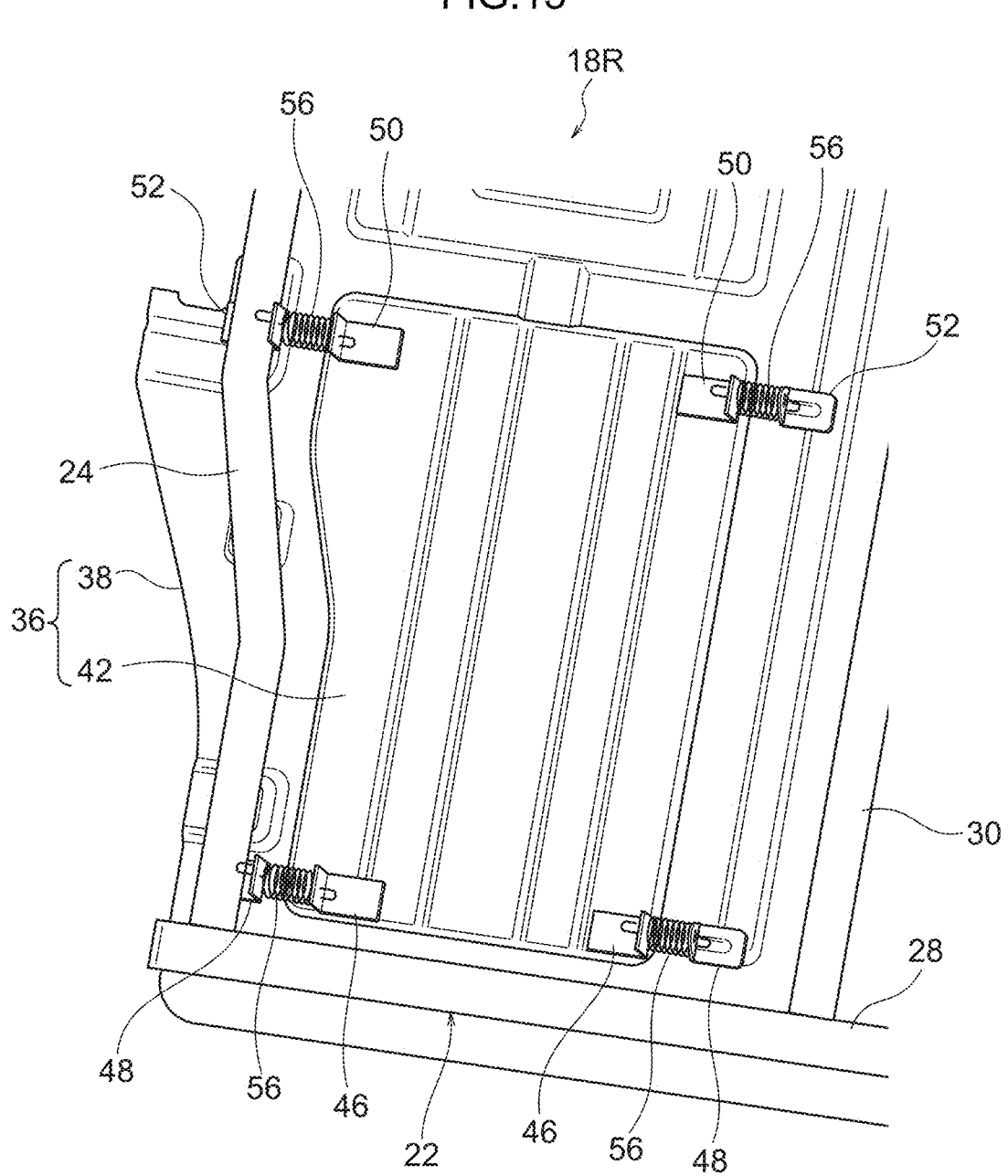
FIG. 15 is a perspective view corresponding to FIG. 3, showing a portion of a seat back frame according to a second exemplary embodiment.
Figure 16:
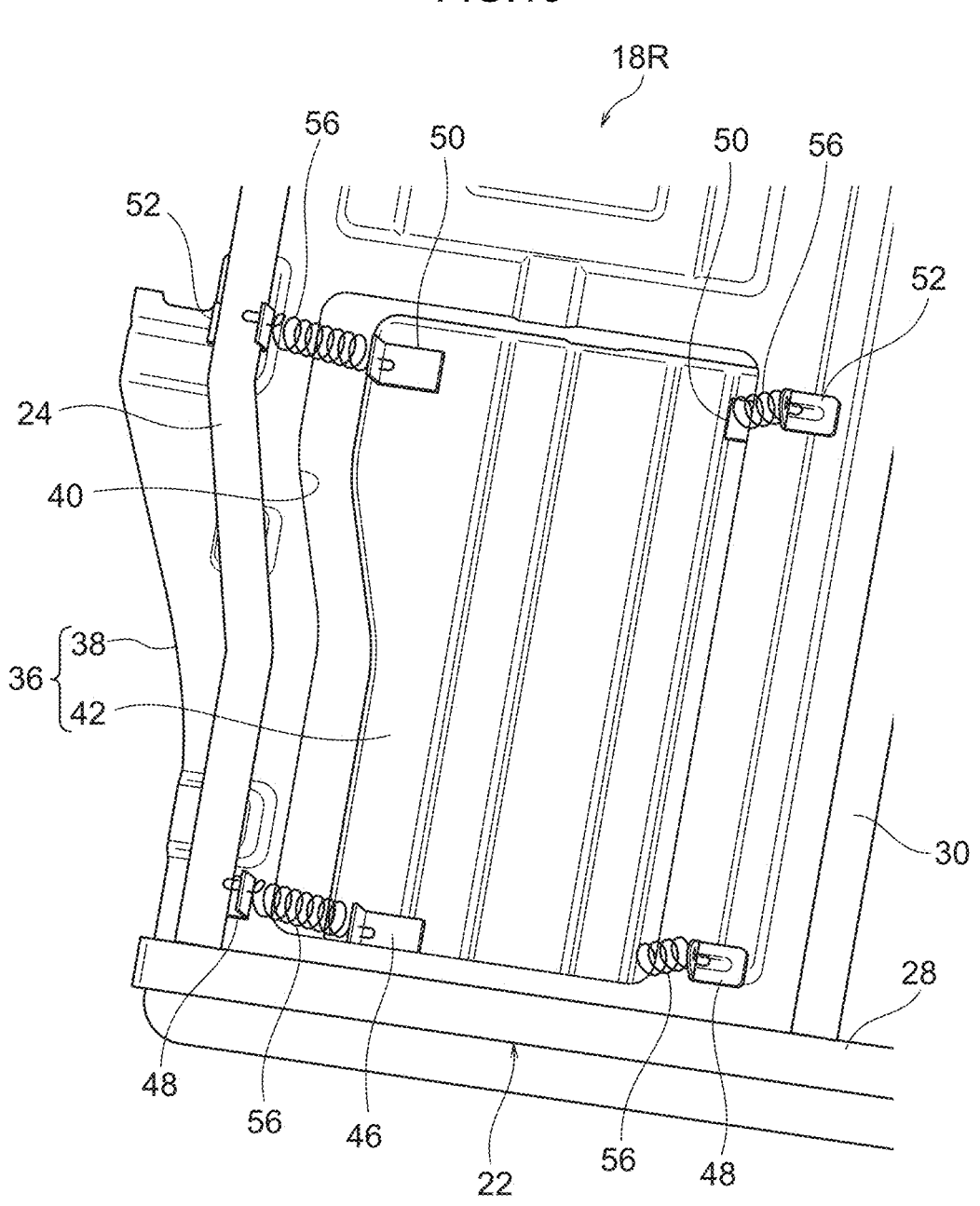
FIG. 16 is a perspective view corresponding to FIG. 15, showing a state in which a separate panel is relatively displaced toward a rear side of the seat back with respect to a panel main body.
Figure 17:
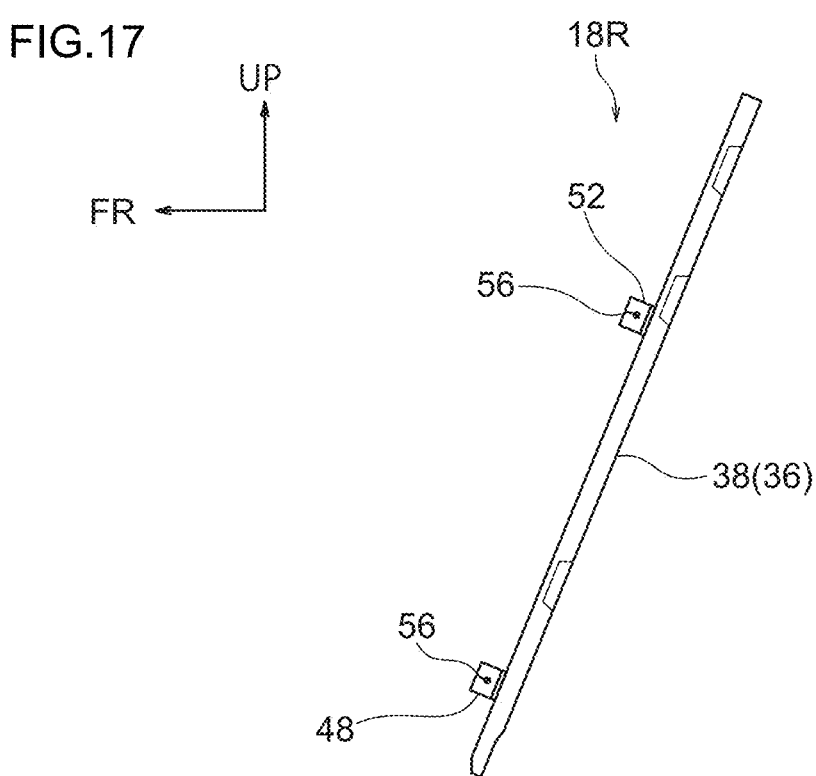
FIG. 17 is a side view showing a portion of the seat back frame according to the second exemplary embodiment.
Figure 18:
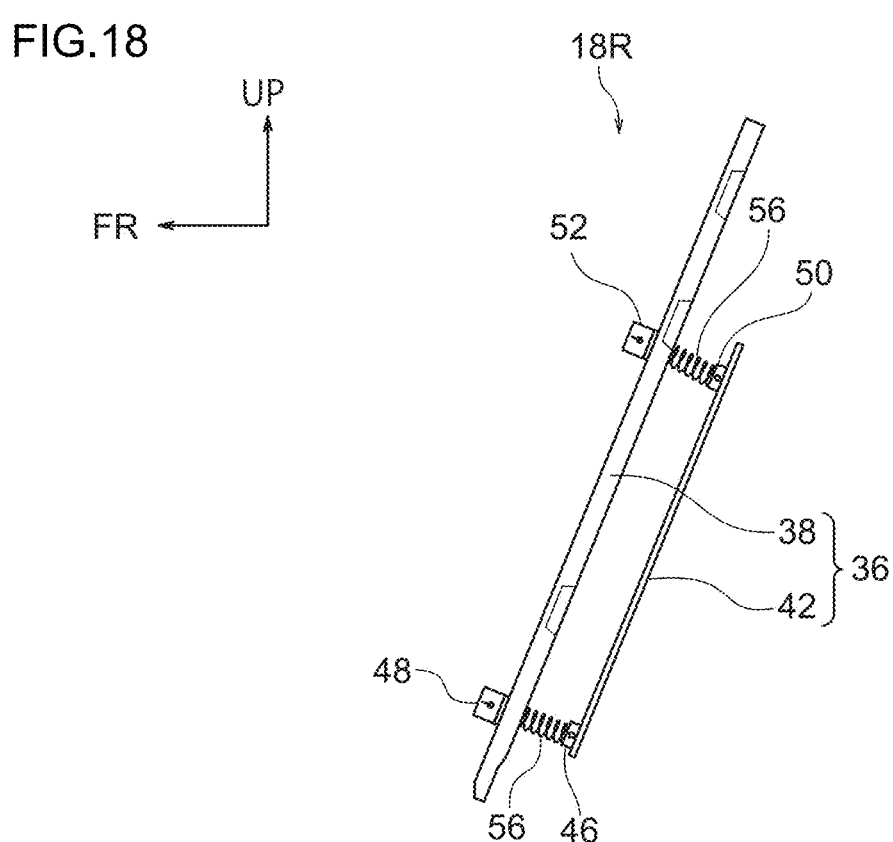
FIG. 18 is a side view corresponding to FIG. 17, showing the state in which the separate panel is relatively displaced toward the rear side of the seat back with respect to the panel main body.

FIG. 15 and FIG. 16 show portions of the seat back frame 18 according to a second exemplary embodiment of the present disclosure in perspective views, and FIG. 17 and FIG. 18 show portions of the seat back frame 18 according to the second exemplary embodiment in side views. In this exemplary embodiment, others of the tension coil springs 56 that are resilient members span between each of the left and right brackets 46 fixed to the lower end portion of the separate panel 42 and the left and right brackets 48 fixed to the panel main body 38. Therefore, the upper end portion and the lower end portion of the separate panel 42 are both coupled to the panel main body 38 via the tension coil springs 56 at left and right. In this exemplary embodiment, structures other than those described above are the same as in the first exemplary embodiment.

In this exemplary embodiment at usual times, the separate panel 42 is retained at the usual position shown in FIG. 15 and FIG. 17 by the respective tension coil springs 56. When a load from the dorsal region B of a seat occupant P acts on the separate panel 42 at a time of rear-end collision of the vehicle, the tension coil springs 56 coupling the separate panel 42 to the panel main body 38 resiliently deform in the tension directions thereof. As a result, the separate panel 42 relatively displaces to the rear side with respect to the panel main body 38. When the above-mentioned load no longer acts on the separate panel 42, the respective tension coil springs 56 resiliently restore. As a result, the separate panel 42 may return to the initial usual position. In this exemplary embodiment too, basically the same effects as in the first exemplary embodiment are provided.

Third Exemplary Embodiment

Figure 19:
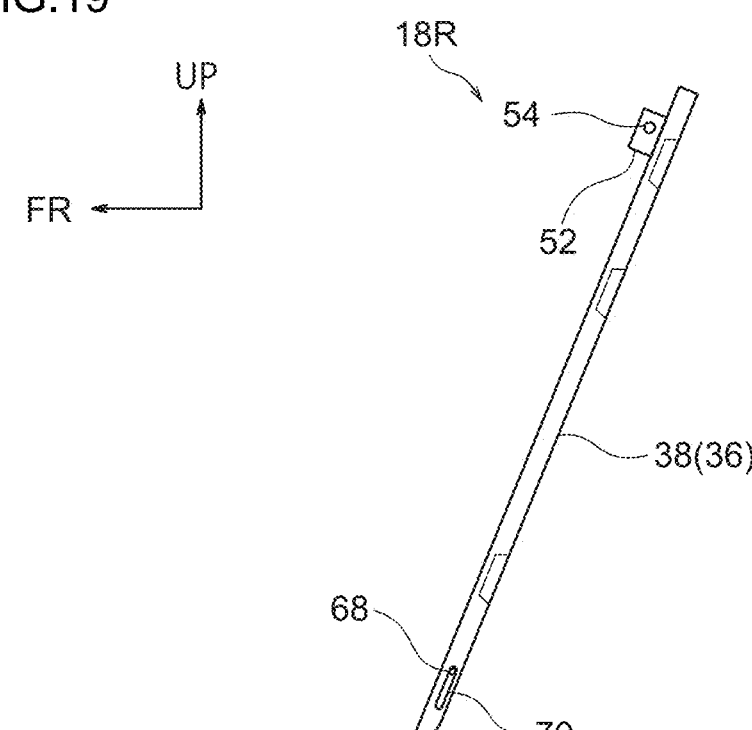
FIG. 19 is a side view showing a portion of a seat back frame according to a third exemplary embodiment.
Figure 20:
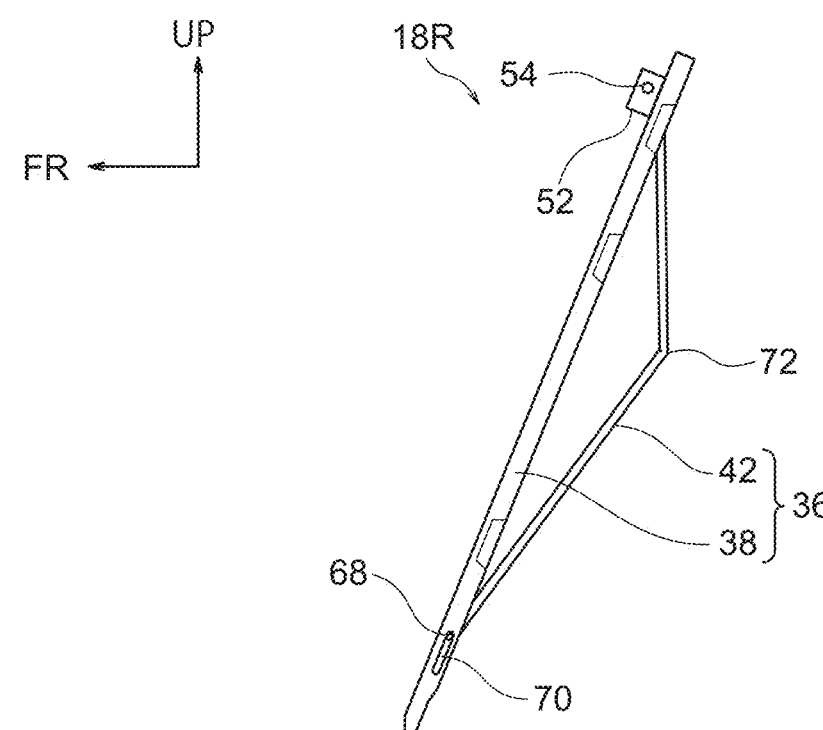
FIG. 20 is a side view corresponding to FIG. 19, showing a state in which a separate panel is relatively displaced toward a rear side of the seat back with respect to a panel main body.
Figure 21:
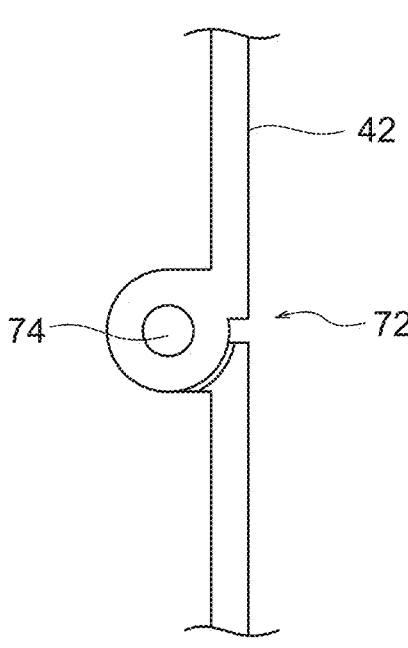
FIG. 21 is a side view showing an example of a hinge provided at the separate panel of the third exemplary embodiment.
Figure 22:
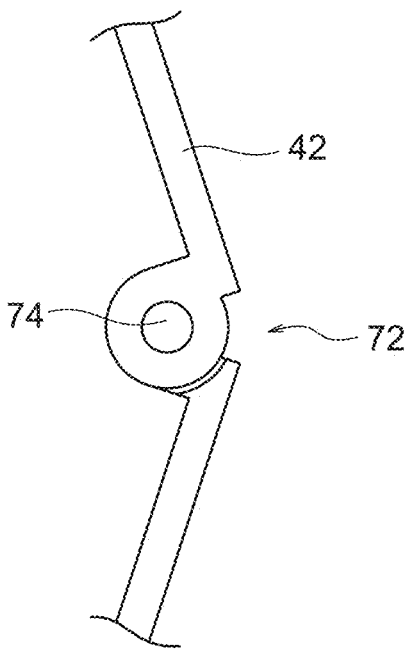
FIG. 22 is a side view showing a state in which the separate panel is inflected at the hinge shown in FIG. 21.
Figure 23:
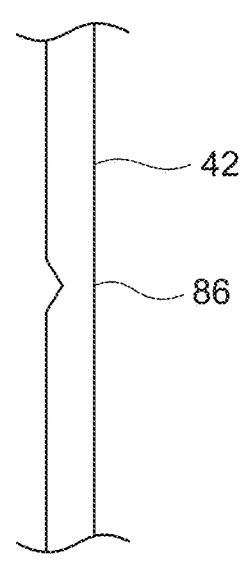
FIG. 23 is a side view showing an alternative example of the hinge provided at the separate panel of the third exemplary embodiment.
Figure 24:
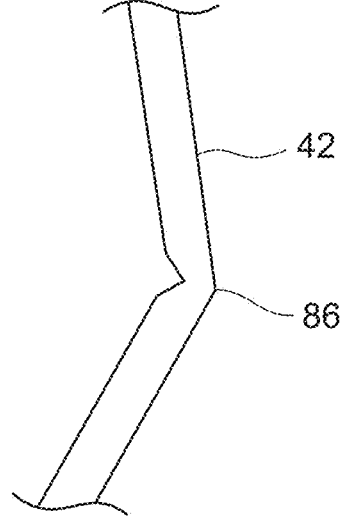
FIG. 24 is a side view showing a state in which the separate panel is inflected at the hinge shown in FIG. 23.

FIG. 19 and FIG. 20 show portions of the seat back frame 18 according to a third exemplary embodiment of the present disclosure in side views. In this exemplary embodiment, the upper end portion (one end portion) of the separate panel 42 is turnably coupled to the panel main body 38 via the shaft 54. Pins 68 that protrude to the outer sides in the left-and-right direction are provided at the lower end portion (another end portion) of the separate panel 42. These pins 68 are inserted into long holes 70 formed in the panel main body 38. Each long hole 70 has a long direction in the vertical direction. Thus, the lower end portion of the separate panel 42 is coupled to the panel main body 38 to be relatively displaceable in the vertical direction. A hinge portion 72 is provided at a vertical direction intermediate portion of the separate panel 42. The hinge portion 72 extends in the left-and-right direction. The hinge portion 72 may include a hinge pin 74 as illustrated in FIG. 21 and FIG. 22, or may be an integral hinge as illustrated in FIG. 23 and FIG. 24. The separate panel 42 is capable of inflecting at the hinge portion 72 (see FIG. 20, FIG. 22 and FIG. 24).

Thus, in this exemplary embodiment the separate panel 42 includes the hinge portion 72 at which the separate panel 42 is inflected. One end portion in a direction orthogonal to the hinge portion 72 (the upper end portion) is turnably coupled to the panel main body 38, and another end portion in the direction orthogonal to the hinge portion 72 (the lower end portion) is coupled to the panel main body 38 to be relatively displaceable to the side thereof at which the one end portion is disposed (the upper side). The lower end portion of the separate panel 42 is urged to the lower side by, for example, an urging member that is not shown in the drawings. Therefore, at usual times the separate panel 42 is retained at the usual position shown in FIG. 19. In this exemplary embodiment, structures other than those described above are the same as in the first exemplary embodiment.

In this exemplary embodiment, when a load from the dorsal region B of a seat occupant P acts on the separate panel 42 at a time of rear-end collision of the vehicle, the separate panel 42 inflects at the hinge portion 72. At this time, the upper end portion of the separate panel 42 turns about the shaft 54 with respect to the panel main body 38, and the lower end portion of the separate panel 42 relatively displaces to the upper side with respect to the panel main body 38. Thus, the separate panel 42 may be relatively displaced to the rear side with respect to the panel main body 38. When the above-mentioned load no longer acts on the separate panel 42, the separate panel 42 may be returned to the initial usual position by the urging force of the urging member that is not shown in the drawings. In this exemplary embodiment too, basically the same effects as in the first exemplary embodiment are provided. The hinge portion 72 that is provided at the separate panel 42 is not limited to extending in the left-and-right direction but may extend in the vertical direction.

Fourth Exemplary Embodiment

Figure 25:
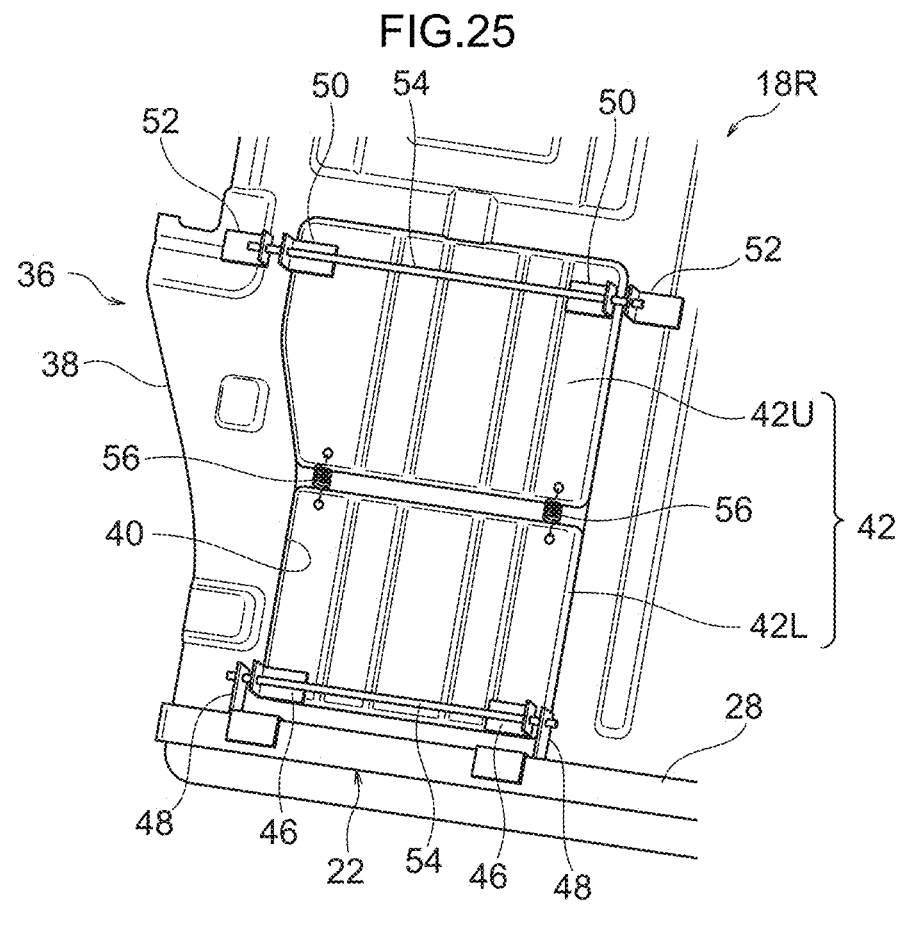
FIG. 25 is a perspective view corresponding to FIG. 3, showing a portion of a seat back frame according to a fourth exemplary embodiment.
Figure 26:
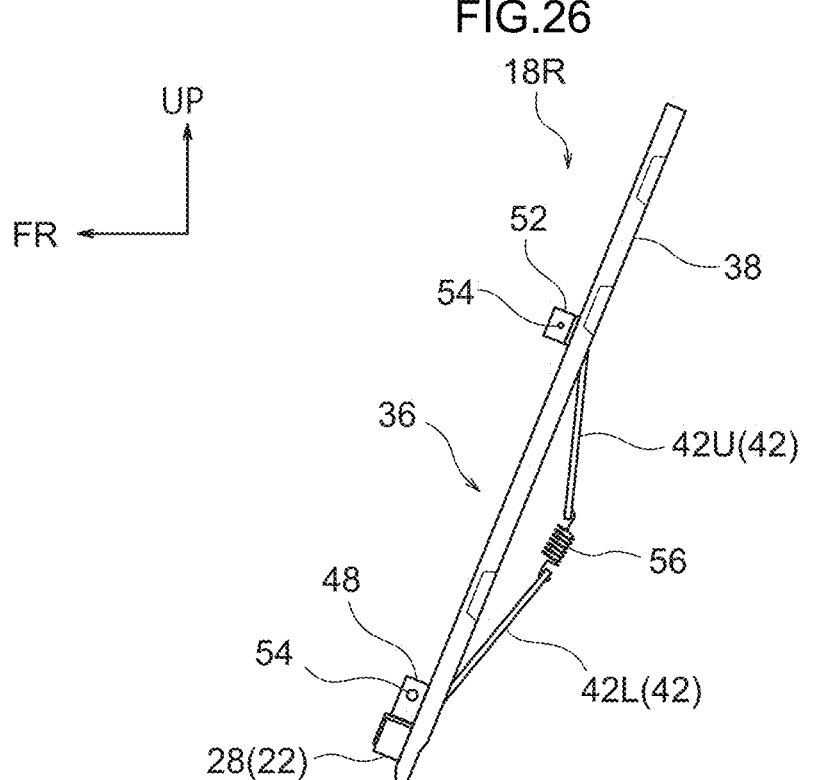
FIG. 26 is a side view showing a portion of the seat back frame according to the fourth exemplary embodiment, which is a view showing a state in which a separate panel is relatively displaced toward a rear side of the seat back with respect to a panel main body.

FIG. 25 shows portions of the seat back frame 18 according to a fourth exemplary embodiment of the present disclosure in a perspective view, and FIG. 26 shows portions of this seat back frame 18 in a side view. In this exemplary embodiment, the separate panel 42 is bisected between upper and lower into an upper side portion 42U (one side portion) and a lower side portion 42L (another side portion). The left and right brackets 50 are fixed to an upper end portion of the upper side portion 42U, the left and right brackets 52 are fixed to the panel main body 38, and the shaft 54 whose axial direction is in the left-and-right direction penetrates through the brackets 50 and the brackets 52. Thus, the upper end portion of the upper side portion 42U is coupled to the panel main body 38 to be turnable about the shaft 54. A left and right pair of the tension coil springs 56 (resilient members) span between the upper side portion 42U and the lower side portion 42L. In this exemplary embodiment, structures other than those described above are the same as in the first exemplary embodiment.

At usual times in this exemplary embodiment, the upper side portion 42U and lower side portion 42L of the separate panel 42 are retained at the usual position shown in FIG. 25 by the left and right tension coil springs 56. When a load from the dorsal region B of a seat occupant P acts on the separate panel 42 at a time of rear-end collision of the vehicle, the left and right tension coil springs 56 coupling the upper side portion 42U to the lower side portion 42L resiliently deform in the tension directions thereof. As a result, the upper side portion 42U turns with respect to the panel main body 38 about the shaft 54 provided at the upper end portion of the upper side portion 42U (the end portion of the upper side portion 42U at the opposite side thereof from the side at which the lower side portion 42L is disposed), and the lower side portion 42L turns with respect to the panel main body 38 about the shaft 54 provided at the lower end portion of the lower side portion 42L (the end portion of the lower side portion 42L at the opposite side thereof from the side at which the upper side portion 42U is disposed). Thus, the separate panel 42 may be relatively displaced to the rear side with respect to the panel main body 38. When the above-mentioned load no longer acts on the separate panel 42, the left and right tension coil springs 56 resiliently restore. As a result, the upper side portion 42U and lower side portion 42L may return to the initial usual positions thereof. In this exemplary embodiment too, basically the same effects as in the first exemplary embodiment are provided. The structure in which the separate panel 42 is bisected between upper and lower is not limiting. A structure is applicable in which the separate panel 42 is bisected between left and right.

Hereabove, a number of exemplary embodiments and variant examples have been illustrated to describe the present disclosure, but numerous modifications are possible within a scope not departing from the gist of the present disclosure. It will also be clear that the scope of the present disclosure is not to be limited to the exemplary embodiments and variant examples described above.

What is claimed is:

1. A seat back frame comprising:

a frame main body provided at a seat back of a vehicle seat, the frame main body being formed in a frame shape as seen in a front-and-rear direction of the seat back; and a seat back panel being disposed at a rear side of the seat back relative to the frame main body, the seat back panel comprising:

a panel main body disposed at a posterior portion of the seat back of the vehicle seat, the panel main body structuring a portion of a main body portion of the seat back frame, and an aperture being formed in the panel main body at a location opposing a dorsal region of a seat occupant; and a separate panel attached to the main body portion and closes up the aperture, and at a time of a rear-end collision of a vehicle, the separate panel receiving a load from the dorsal region and relatively displacing toward the rear side of the seat back with respect to the panel main body, 5 wherein the panel main body is fixed to the frame main body and structures the main body portion, wherein the separate panel is coupled to the main body portion via a resilient member, and configured to be retained at a usual position that closes up the aperture of the panel main body during usual times when no rear-end collision load is applied, 10 wherein the separate panel comprises an abutting portion that abuts against a rim portion of the aperture from the rear side of the seat back, and 15 wherein distal end portions of the abutting portion of the separate panel are inflected toward a front side of the seat back and inserted into penetrating holes formed in the panel main body. 20

2. The seat back frame according to claim 1, wherein:

one end portion of the separate panel is turnably coupled to the main body portion, and another end portion of the separate panel is coupled to the main body portion via the resilient member. 25

3. A vehicle seat comprising:

a seat cushion on which a seat occupant sits;

the seat back frame according to claim 1; and a seat back that serves as a backrest for the seat occupant, a framework of the seat back being structured by the seat back frame. 30

\*    \*    \*    \*    \*